(12) United States Patent
Tanibata

(10) Patent No.: US 12,112,534 B2
(45) Date of Patent: Oct. 8, 2024

(54) STICKING DETERMINATION DEVICE AND STICKING DETERMINATION METHOD

(71) Applicant: DENSO CORPORATION, Kariya (JP)

(72) Inventor: Nobuhiko Tanibata, Kariya (JP)

(73) Assignee: DENSO CORPORATION, Kariya (JP)

( * ) Notice: Subject to any disclaimer, the term of this patent is extended or adjusted under 35 U.S.C. 154(b) by 408 days.

(21) Appl. No.: 17/453,989

(22) Filed: Nov. 8, 2021

(65) Prior Publication Data

US 2022/0058412 A1    Feb. 24, 2022

Related U.S. Application Data

(63) Continuation of application No. PCT/JP2020/012557, filed on Mar. 20, 2020.

(30) Foreign Application Priority Data

Jun. 3, 2019    (JP) ................. 2019-103813

(51) Int. Cl.
*G06V 10/98*    (2022.01)
*G06T 1/20*    (2006.01)
*G06T 1/60*    (2006.01)
*G06V 10/75*    (2022.01)

(52) U.S. Cl.
CPC ............. *G06V 10/98* (2022.01); *G06T 1/20* (2013.01); *G06T 1/60* (2013.01); *G06V 10/751* (2022.01)

(58) Field of Classification Search
CPC ........ G06V 10/98; G06V 10/751; G06T 1/20; G06T 1/60; H04N 23/60; H04N 25/75; H04N 7/18; H04N 17/00; G09G 2360/145; G09G 3/006; G09G 5/00
USPC .......................................... 348/246
See application file for complete search history.

(56) References Cited

U.S. PATENT DOCUMENTS

| | | | |
|---|---|---|---|
| 2006/0164228 A1* | 7/2006 | Tseng | G08G 1/168 348/148 |
| 2007/0103567 A1* | 5/2007 | Wloka | H04N 21/4223 348/E5.079 |
| 2009/0245590 A1* | 10/2009 | Holl | G07D 7/187 382/162 |
| 2010/0173670 A1* | 7/2010 | Wloka | H04N 5/772 455/556.1 |

(Continued)

FOREIGN PATENT DOCUMENTS

| | | |
|---|---|---|
| JP | 6011935 B2 | 10/2016 |
| WO | WO-2015182751 A1 | 12/2015 |

*Primary Examiner* — Usman A Khan
(74) *Attorney, Agent, or Firm* — Harness, Dickey & Pierce, P.L.C.

(57) ABSTRACT

A sticking determination device includes a CPU, a GPU, a memory, a bus, and an image acquiring unit configured to acquire an image data from the camera and save the image data to the memory. The image acquiring unit transmits, to the CPU, a save completion notification indicative of completion of saving respective one of divided units of the image data. The CPU transmits a read instruction to the GPU to read, from the memory, a pixel value of at least one pixel at a sticking determination target position. The GPU reads the pixel value of the at least one pixel from the memory and transmits the read pixel value to the CPU. The CPU is configured to determine whether the image data is stuck by comparing the pixel value in a current frame with the pixel value in a previous frame.

18 Claims, 2 Drawing Sheets

(56) References Cited

U.S. PATENT DOCUMENTS

2017/0195556 A1   7/2017   Emi et al.

* cited by examiner

STICKING DETERMINATION DEVICE AND STICKING DETERMINATION METHOD

CROSS REFERENCE TO RELATED APPLICATION

The present application is a continuation application of International Patent Application No. PCT/JP2020/012557 filed on Mar. 20, 2020, which designated the U.S. and claims the benefit of priority from Japanese Patent Application No. 2019-103813 filed on Jun. 3, 2019. The entire disclosures of all of the above applications are incorporated herein by reference.

TECHNICAL FIELD

The present disclosure relates to a sticking determination device and a sticking determination method for determining whether data of an image taken by a camera is stuck.

BACKGROUND

A technique for displaying an image taken by a camera on a display device is known. In a general technique, an anomaly of data of the image displayed on the display device is automatically detected. In this technique, moving objects are removed from the image data of a captured area after the image data of one frame is obtained from the camera. Subsequently, the image data of the captured area is divided into pieces, and the anomaly of the image is detected based on luminance values in each piece or an average of the luminance values in each piece.

SUMMARY

According to a first aspect of the present disclosure, a sticking determination device is configured to determine whether image data having pixel values of a plurality of pixels that form an image taken by a camera is stuck. The sticking determination device includes a CPU, a GPU, a memory, a bus that connects together the CPU, the GPU, and the memory, and an image acquiring unit configured to acquire the image data from the camera and save the image data to the memory. The image data of each frame is formed of a plurality of divided units. Upon saving a respective one of the plurality of divided units to the memory, the image acquiring unit transmits, to the CPU, a save completion notification indicative of completion of saving the respective one of the plurality of divided units. Upon receiving the save completion notification, the CPU transmits a read instruction to the GPU to read, from the memory, the pixel value of at least one pixel of the plurality of pixels that is at a sticking determination target position. Upon receiving the read instruction from the CPU, the GPU reads the pixel value of the at least one pixel from the memory and transmits the read pixel value to the CPU. The CPU is configured to perform a pixel value comparison process to determine whether the image data is stuck by comparing the pixel value of the at least one pixel in a current frame that is read from the memory with the pixel value of the at least one pixel in a previous frame.

According to a second aspect of the present disclosure, a sticking determination device is configured to determine whether image data having pixel values of a plurality of pixels that form an image taken by a camera is stuck. The sticking determination device includes a CPU, a GPU, a memory, a bus that connects together the CPU, the GPU, and the memory, and an image acquiring unit configured to acquire the image data from the camera and save the image data to the memory. Upon saving a part or whole of the image data of one frame to the memory, the image acquiring unit transmits, to the CPU, a save completion notification indicative of completion of saving. Upon receiving the save completion notification, the CPU transmits a read instruction to the GPU to read, from the memory, the pixel value of at least one pixel of the plurality of pixels that is at a sticking determination target position. Upon receiving the read instruction from the CPU, the GPU reads the pixel value of the at least one pixel from the memory and transmits the read pixel value to the CPU. The CPU is configured to perform a pixel value comparison process to determine whether the image data is stuck by comparing the pixel value of the at least one pixel in a current frame that is read from the memory with the pixel value of the at least one pixel in a previous frame. The CPU is configured to use positions of some pixels of the plurality of pixels of the image data of each frame as the sticking determination target positions.

According to a third aspect of the present disclosure, a method is for a device to determine whether image data having pixel values of a plurality of pixels that form an image taken by a camera is stuck. The device includes a CPU, a GPU, a memory, a bus that connects together the CPU, the GPU, and the memory, and an image acquiring unit configured to acquire the image data and save the image data to the memory. The image data of each frame is formed of a plurality of divided units. The method includes, upon saving a respective one of the plurality of divided units to the memory by the image acquiring unit, transmitting, to the CPU by the image acquiring unit, a save completion notification indicative of completion of saving the respective one of the plurality of divided units. The method includes, upon receiving the save completion notification by the CPU, transmitting by the CPU a read instruction to the GPU to read, from the memory, the pixel value of at least one pixel of the plurality of pixels that is at a sticking determination target position. The method includes, upon receiving the read instruction from the CPU by the GPU, reading by the GPU the pixel value of the at least one pixel from the memory. The method includes transmitting the read pixel value to the CPU by the GPU. The method includes performing a pixel value comparison process by the CPU to determine whether the image data is stuck by comparing the pixel value of the at least one pixel in a current frame that is read from the memory with the pixel value of the at least one pixel in a previous frame.

According to a fourth aspect of the present disclosure, a method is for a device to determine whether image data having pixel values of a plurality of pixels that form an image taken by a camera is stuck. The device includes a CPU, a GPU, a memory, a bus that connects together the CPU, the GPU, and the memory, and an image acquiring unit configured to acquire the image data and save the image data to the memory. The method includes, upon saving a part or whole of the image data of one frame to the memory by the image acquiring unit, transmitting, to the CPU by the image acquiring unit, a save completion notification indicative of completion of saving. The method includes, upon receiving the save completion notification by the CPU, transmitting by the CPU a read instruction to the GPU to read, from the memory, the pixel value of at least one pixel of the plurality of pixels that is at a sticking determination target position. The method includes, upon receiving the read instruction from the CPU by the GPU, reading by the GPU the pixel value of the at least one pixel from the memory. The method includes transmitting the read pixel value to the CPU by the GPU. The method includes performing a pixel value comparison process by the CPU to determine whether the image data is stuck by comparing the pixel value of the at least one pixel in a current frame that is read from the memory with the pixel value of the at least one pixel in a previous frame. Positions of some pixels of the plurality of pixels of the image data of each frame are used as the sticking determination target positions.

EMBODIMENTS

Comparative Example

There is a demand for determining whether sticking, which is one of anomalies in image data, has occurred. When the image data is stuck, luminance values do not change. In contrast, when the image data is not stuck, the luminance values change over time. Therefore, it can be determined that the image data is not stuck when the luminance values change over time.

In a comparative example of the present disclosure, target regions are set and an average of the luminance values in each target region is calculated to reduce a load for processing signals. Here, suppose that a camera is mounted in a vehicle, for example. Even when the image data is not stuck, the change in the luminance value of each pixel is small while the vehicle is stopped. Accordingly, when the average of the luminance values in the target region is used for detecting the sticking of the image data as in Patent Literature 1, the average of the luminance values in a normal condition is slightly different from that in a condition where the image data is stuck. That is, it may be difficult to detect the sticking based on the average.

In view of the above, it may be considered to compare the luminance value with a previous luminance value for each pixel. In the technique disclosed in Patent Literature 1, the process to detect the anomalies in the whole image data of the captured area is started after the image data of one frame is retrieved.

In a general device configured to display the image data taken by the camera, a CPU, a GPU, and a memory are connected together through a bus. When the luminance value of each pixel is compared with the previous value, the processes (1)-(4) may be performed.

(1) The image data taken by the camera is saved to the memory. (2) The CPU requests the GPU through the bus to acquire from the memory the pixel value of the pixel which is to be compared. (3) The GPU acquires, from the memory through the bus, the pixel value requested by the CPU, and provides the acquired pixel value to the CPU. (4) The CPU saves the provided pixel value and compares it with the previous pixel value. These processes (1)-(4) are performed for every pixel.

The CPU operates in the above processes (2)-(4). Accordingly, a load on the CPU to perform the processes (2)-(4) is high.

EMBODIMENT

Figure 1:
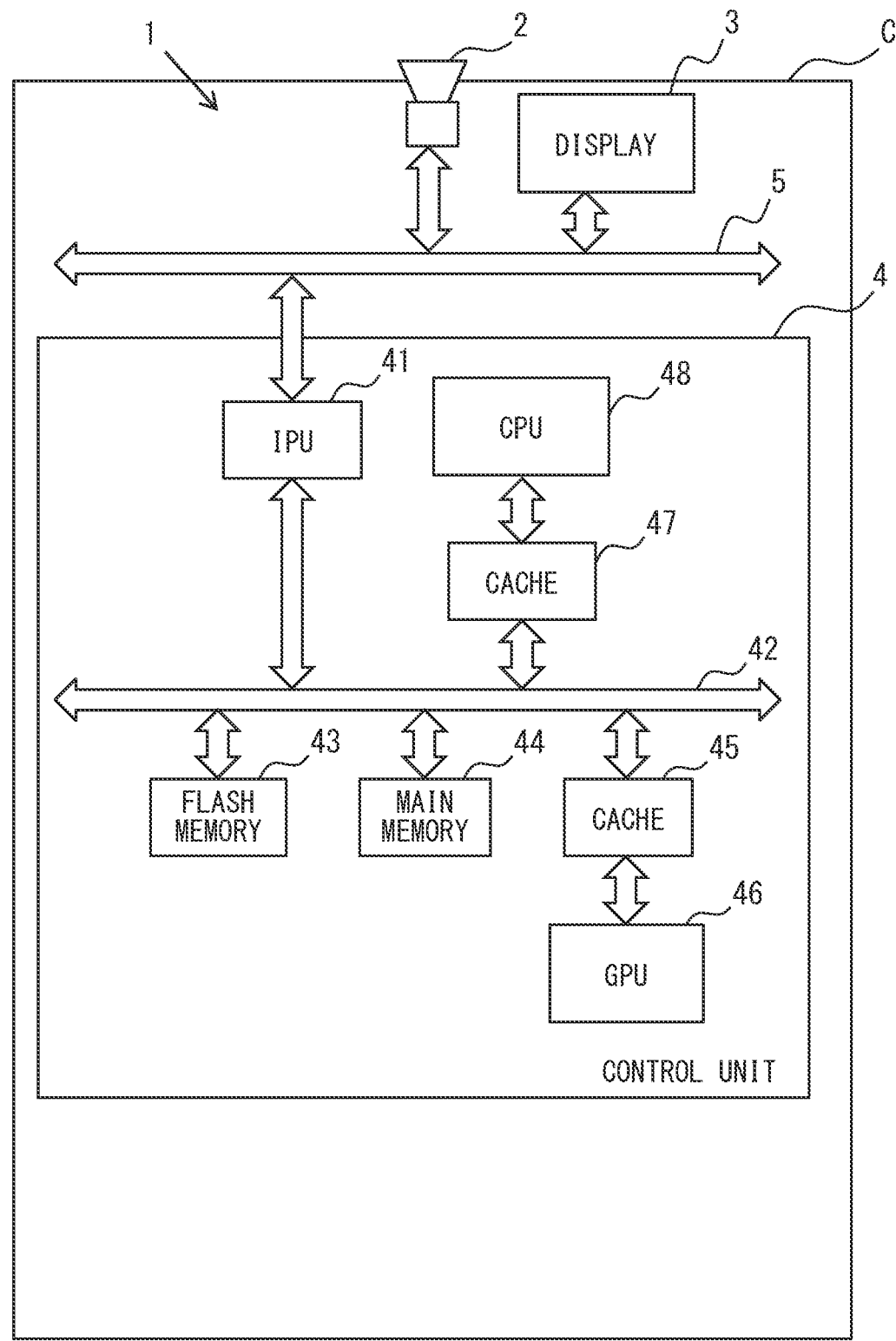
FIG. 1 is a diagram illustrating a configuration of a camera image display system.

An embodiment will be described below with reference to the drawings. FIG. 1 is a diagram illustrating a configuration of a camera image display system 1. The camera image display system 1 is mounted in a vehicle C. The camera image display system 1 includes a camera 2, a display 3, and a control unit 4. The camera 2, the display 3, and the control unit 4 are connected with an in-vehicle LAN bus 5. The camera 2, the display 3, and the control unit 4 are configured to communicate signals through the in-vehicle LAN bus 5.

The camera 2 is installed outside the vehicle C in a position to take images of an area in front of the vehicle C. The camera 2 may be installed in a position to take images of an area behind the vehicle C or the inside of the passenger compartment. The camera 2 is configured to take consecutive images. One image taken by the camera 2 is called one frame. The camera 2 may be configured to capture video by taking more than a few dozen frames per second. The camera 2 includes an image sensor having multiple pixels. The camera 2 is configured to represent the image by a value (hereinafter, referred to as image value) detected by each pixel of the image sensor. The pixel value is a luminance value for each color. The camera 2 is configured to output image data including the pixel values of each pixel to represent the taken image. The image taken by the camera 2 of the present embodiment has a rectangular shape, and the camera 2 is configured to output one horizontal line of the image data at a time.

The display 3 is arranged at a position that can be visually recognized by an occupant in the passenger compartment of the vehicle C. The display 3 is configured to display various images. As the display 3, a liquid crystal display or an organic EL display can be used.

As shown in FIG. 1, the control unit 4 includes an IPU (Image Processing Unit) 41, a bus 42, a flash memory 43, a main memory 44, a cache 45, a GPU (Graphics Processing Unit) 46, a cache 47, and a CPU (Central Processing Unit) 48. The control unit 4 is configured to display the image taken by the camera 2 on the display 3. The control unit 4 is configured to sequentially determine whether the image data is stuck. That is, the control unit 4 is a sticking determination device and is configured to perform a sticking determination method. The sticking is a state where the pixel value output from a certain pixel, which should change under normal condition, does not change.

The IPU 41 is an image acquiring unit and has a processor. The IPU 41 is configured to acquire the image data from the camera 2 and save the image data to the main memory 44. Since the camera 2 is configured to output the image data one horizontal line at a time, the IPU 41 acquires the image data one horizontal line at a time. The IPU 41 is configured to save one horizontal line of the image data every time the one horizontal line is acquired. In the present embodiment, one horizontal line is a divided unit many of which form the image data of one frame. The IPU 41 is configured to output a save completion notification to the CPU 48 every time the IPU 41 saves the one horizontal line of the image data to the main memory 44. The bus 42 is connected with the IPU 41, the flash memory 43, the main memory 44, the cache 45, and the cache 47. The flash memory 43 is a non-volatile memory. The flash memory 43 stores programs executed by the CPU 48, for example. The main memory 44 is a volatile memory. The main memory 44 is composed of DRAM, for example. The main memory 44 stores the image data. The image data stored in the main memory 44 is deleted from the main memory 44 after the image represented by the image data is displayed on the display 3. The cache 45 is configured to communicate the data with the GPU 46. The cache 45 is composed of SRAM, for example.

The GPU 46 is a processor for processing images, and configured to read the image data stored in the main memory 44 and display the image on the display 3 based on the image data. When the GPU 46 receives a read instruction from the CPU 48, the GPU 48 reads the image data from the main memory 44 according to the read instruction. The GPU 46 is configured to transmit the read image data to the CPU 48.

The cache 47 is configured to communicate the data with the CPU 48. The cache 47 is composed of SRAM, for example. The CPU 48 has a processor and is configured to instruct the GPU 46 to cause the display 3 to display the image taken by the camera 2. The CPU 48 is configured to function as a sticking determination unit configured to perform a sticking determination process. The sticking determination process is a process for determining whether the image data is stuck.

The CPU 48 is configured to perform the sticking determination process at a predetermined frequency. For example, the CPU 48 is configured to perform the sticking determination process for each frame. When the CPU 48 performs the sticking determination process, the CPU 48 outputs the read instruction to the GPU 46. The read instruction is an instruction to read, from the main memory 44, the image data of the image at a sticking determination target position. The sticking determination target position is a position of a pixel based on which it is determined whether the image data is stuck.

In the present embodiment, the sticking determination target positions do not include positions of all pixels of one frame, but only positions of some pixels. Specifically, in the present embodiment, the positions of some pixels in one horizontal line is used as the sticking determination target position. Accordingly, in the present embodiment, each horizontal line includes pixel positions that are not the sticking determination target positions and pixel positions that are the sticking determination target position.

Figure 2:
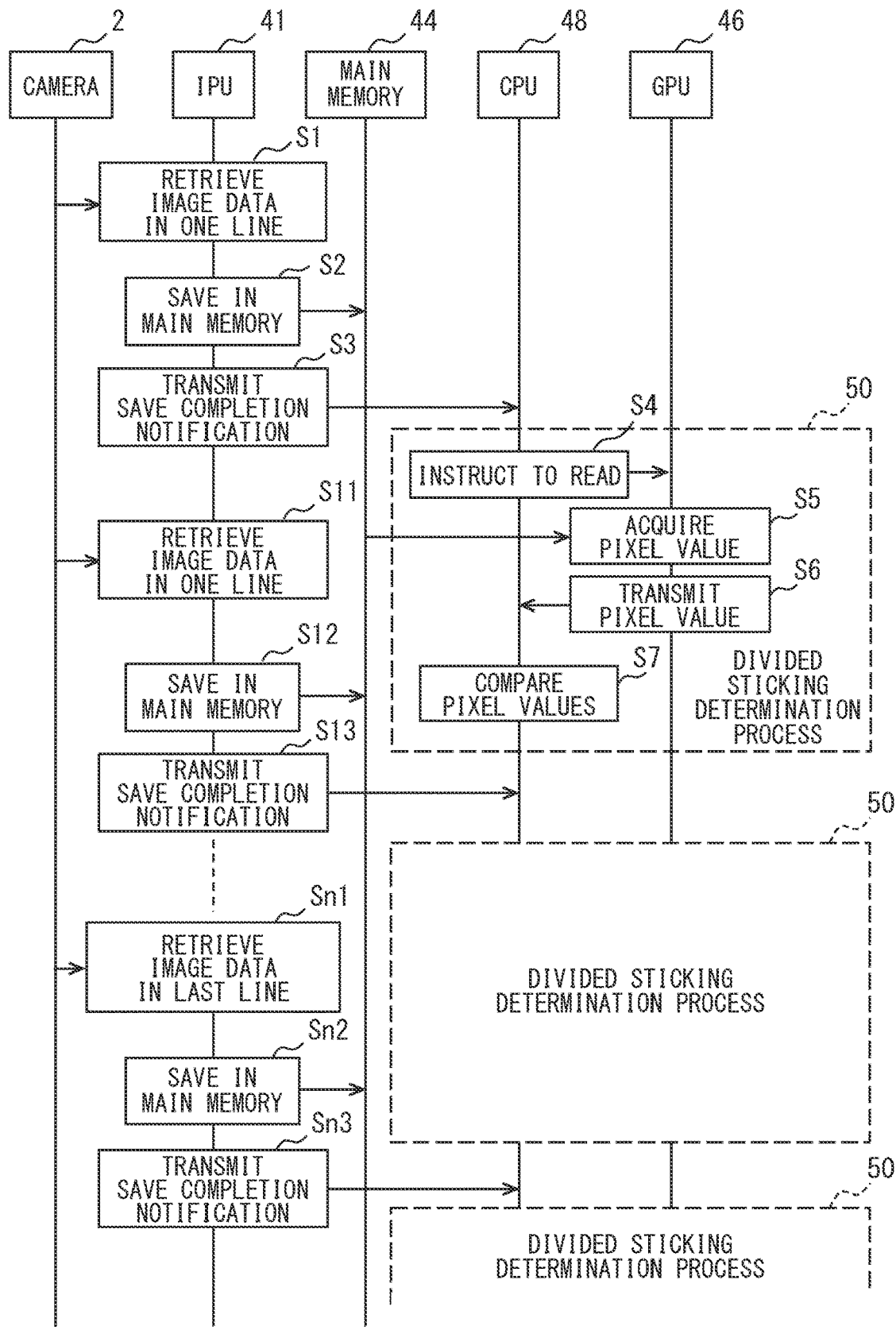
FIG. 2 is a diagram illustrating a sticking determination process performed by CPU and processes performed by IPU and GPU in relation to the sticking determination process.

FIG. 2 shows the sticking determination process performed by the CPU 48 and processes performed by the IPU 41 and the GPU 46 in relation to the sticking determination process. The processes shown in FIG. 2 are performed for every frame. In step S1, the IPU 41 retrieves one horizontal line of the image data from the camera 2.

In step S2, the IPU 41 saves the image data retrieved in step S1 to the main memory 44. In step S3, the IPU 41 transmits the save completion notification to the CPU 48. The save completion notification is a notification representing that one horizontal line of the image data was retrieved, and contains information indicating that the number of the retrieved horizontal data in the image data.

The CPU 48 performs step S4 upon receiving the save completion notification. In step S4, the read instruction is transmitted to the GPU 46. The read instruction contains information identifying the pixel whose pixel values will be compared. In the present embodiment, the pixel whose pixel values are compared is the same pixel regardless of the frame.

In step S5, the GPU 46 acquires, from the main memory 44, the pixel value of the pixel identified from the read instruction upon receiving the read instruction. In step S6, the GPU 46 transmits the pixel value acquired in step S5 to the CPU 48. In step S7, the CPU 48 compares the current pixel value transmitted from the GPU 46 in step S6 with the previous pixel value of the pixel whose pixel value is read this time. When the current pixel value is equal to the previous pixel value as a result of the comparison, the CPU 48 determines that the image data is stuck. The CPU 48 stores the previous pixel value in the cache 47 until the process in step S7 is completed. The process in step S7 is a pixel value comparison process. Steps from step S4 to step S7 are a divided sticking determination process 50. The divided sticking determination process 50 is a process for determining whether one horizontal line which is the divided unit of the image data is stuck. A sticking determination process is a process in which the divided sticking determination process 50 is performed for all of the divided units, i.e. each horizontal line in the present embodiment.

In FIG. 2, steps S4-S7 are illustrated once each. However, when multiple pixel positions are used as the sticking determination target positions in the one horizontal line, only some pixels included in the sticking determination target positions may be instructed to be read in one step S4. For example, only one pixel is instructed to be read in one step S4. When only some pixels included in the sticking determination target positions of one horizontal line are instructed to be read in one step S4, steps S4-S7 are repeated until the pixel value comparison process is completed for all of the pixel values in the sticking determination target positions of the one horizontal line.

Step S11 is the same process as step S1 except that one horizontal line of the image data to be retrieved is the next line of the one horizontal line retrieved in step S1. Steps S12, S13 are the same as steps S2, S3. The IPU 41 performs step S11 after step S3. Accordingly, Steps S11, S12, S13 are performed in parallel with the divided sticking determination process 50 by the CPU 48 and the GPU 46. Since the IPU 41 performs step S13, the CPU 48 and the GPU 46 can perform the divided sticking determination process 50 for one horizontal line in steps S11-S13 using the retrieved one horizontal line of the image data.

Steps Sn1, Sn2, Sn3 are the same as steps S1, S2, S3. "n" represents the number of the horizontal lines constituting the one frame. That is, in step Sn1, the last line of the image data is retrieved. Steps Sn2, Sn3 are the same as steps S2, S3.

When it is determined that at least one pixel position is stuck as a result of the divided sticking determination processes 50 for all horizontal lines, the CPU 48 determines that the image data is stuck. When it is determined that the image data is stuck, the CPU 48 performs a preset process for a sticking situation, e.g. outputs a warning image on the display 3.

Summary of Embodiment

In the present embodiment described above, in the control unit 4, the IPU 41 is configured to transmit the save completion notification to the CPU 48 upon saving one horizontal line of the image data to the main memory 44. The CPU 48 starts the divided sticking determination process 50 upon receiving the save completion notification (S4). Accordingly, the divided sticking determination process 50 that is a part of the sticking determination process divided based on the divided unit before whole image data of one frame is saved to the main memory 44. That is, the sticking determination process can be started earlier than a case where the sticking determination process is started after whole image data of one frame is saved to the main memory 44.

Since the sticking determination process can be started earlier, the load for the process can be separated compared with a case where the sticking determination process is started after whole image data of one frame is saved to the main memory 44.

This will be described in detail. Suppose that the sticking determination process is started after the process in step Sn3 is completed. The sticking determination process should be completed by the same time as the present embodiment. For example, the sticking determination process should be completed before the camera 2 takes the next frame. This is a comparative example. In contrast to the comparative example, in the present embodiment, the time available for the divided sticking determination processes 50 is longer by the time length from the time when the process in step S3 ends to the time when the process in step Sn3 ends. That is, in the comparative example, it is required to complete the sticking determination process in a shorter time than the present embodiment, and accordingly an expensive CPU 48 having a high processing speed is required.

In contrast, in the present embodiment, the time available for the divided sticking determination processes 50 is longer by the time length from the time when the process in step S3 ends to the time when the process in step Sn3 ends compared with the comparative example. That is, the sticking determination process is divided by starting the divided sticking determination process 50 (i.e. a part of the sticking determination process) at the time when the process in step S3 ends. As a result, the process required to be performed per unit time can be reduced, and accordingly the load on the CPU 48 can be reduced.

In steps S4, S5, S6 included in the divided sticking determination process 50, the image data is transmitted through the bus 42. In the comparative example, the processes in steps S4, S5, S6 also concentrate in a certain period. Accordingly, a bus 42 having high communication speed is needed. In contrast, in the present embodiment, since the processes of the CPU 48 is separated over time by the divided sticking determination process 50, the load on the bus 5 per the unit time is also reduced.

Further, in the present embodiment, only some of the pixel positions in one frame are used as the sticking determination target positions in the sticking determination process for one frame. Accordingly, the number of the sticking determination target positions is reduced compared with a case where all of the pixel positions in one frame are used as the sticking determination target positions. In this respect as well, the load on the CPU 48 can be reduced.

Whether an imaging area of the camera 2 is outside the vehicle or inside the vehicle, an imaging target of the camera 2 is analog information. Accordingly, when the image data is not stuck, the pixel value at the same pixel position is not constant even when the camera 2 is not moving. When the image data is stuck, data of only one pixel is not stuck, but data of multiple or all of pixels are usually stuck.

Accordingly, even when some of the pixel positions in one frame are used as the sticking determination target positions as in the present embodiment, the deterioration in accuracy of the sticking determination can be suppressed.

According to the present embodiment, the load on the CPU 48 can be reduced while the deterioration in accuracy of the sticking determination can be suppressed.

In the present embodiment, the camera 2 is mounted in the vehicle C. When the camera 2 is configured to take an image of an outside area in front of or behind the vehicle, the control unit 4 is configured to determine for every frame whether the sticking occurs such that the vehicle control and driving operation are safely performed. It may be also required to reduce the cost of the control unit 4. Therefore, it may be difficult to use the high-performance CPU 48.

In the present embodiment, since the load on the CPU 48 can be reduced as described above, an expensive CPU 48 having a high processing speed is not necessary. According to the present embodiment, the sticking can be determined for every frame with an inexpensive control unit 4.

Although the embodiment has been described above, the disclosed technology is not limited to the above-described embodiment, and the following modifications are included in the disclosed range, and various modifications can be made without departing from the gist except as described below. In the following description, elements having the same reference numerals as those used so far are the same as elements having the same reference numerals in the previous embodiments, except when specifically mentioned. When only some parts of the configuration are described, the previously described embodiment may be applied to other parts of the configuration.

First Modification

In the embodiment, only some of the pixel positions are used as the sticking determination target positions in the divided sticking determination process 50. However, the load on the CPU 48 can be reduced by the divided sticking determination process 50 as described above. Accordingly, all of the pixel positions may be used as the sticking determination target positions instead of using only some of the pixel positions as the sticking determination target positions.

Second Modification

The load on the CPU 48 can be reduced by using only some pixel positions as the sticking determination target positions. Accordingly, when only some pixel positions are used as the sticking determination target positions, the divided sticking determination process 50 may be omitted, and the pixel value in each sticking determination target position may be compared with previous pixel value after saving whole image data is saved to the main memory 44.

Third Modification

In the embodiment, the sticking determination target positions are fixed. Accordingly, in the embodiment, the number of the pixel positions used as the sticking determination target positions does not change. However, the number of the pixel positions used as the sticking determination target positions may be reduced as the load on the CPU 48 increases. The number of the pixel positions used as the sticking determination target positions may be reduced in steps or continuously based on the load on the CPU 48. The load on the CPU 48 can be determined from the usage of the CPU 48. The lower the usage of the CPU 48 is, the less the load on the CPU 48 is.

The CPU 48 is configured to instruct the GPU 46 to perform processes (hereinafter, referred to as other processes) other than the sticking determination process and the process to display the image taken by the camera 2 on the display 3. Accordingly, the delay of the other processes can be suppressed by reducing the number of the pixel positions used as the sticking determination target positions as the load on the CPU 48 increases, as described in the third modification.

In the third modification, the number of the pixel positions used as the sticking determination target positions in the sticking determination process is reduced as the load on the CPU 48 is lower. The accuracy in the sticking determination increases as the number of the pixel positions used as the sticking determination target positions increases. Therefore, according to the third modification, the accuracy in the sticking determination can be improved while the delay in the other processes is suppressed.

When the number of the pixel positions used as the sticking determination target positions are changed according to the load on the CPU 48, at least some of sticking determination target positions may not be included in the previous sticking determination target positions. In the following modifications also, at least some of the current sticking determination target positions may not be included in the previous sticking determination target positions.

When at least some of the current sticking determination target positions are not included in the previous sticking determination target positions, the previous image data is saved to the main memory 44 in addition to the current image data, and the GPU 46 acquires the current pixel values and the previous pixel values in step S5. In this case, the GPU 46 transmits the current pixel values and the previous pixel values to the CPU 48 in step S6.

Fourth Modification

In the embodiment, the sticking determination target positions are fixed. However, at least some of the pixel positions used as the sticking determination target positions may be changed for each frame. The pixel positions used as the sticking determination target positions may be changed by one pixel horizontally from the previous sticking determination target positions. In this case, when the previous sticking determination target positions include a pixel position at the end of one horizontal line and the adjacent pixel does not exist, the next sticking determination target position for that pixel position is the pixel position at the other end of the one horizontal line.

Fifth Modification

When at least some pixel positions used as the sticking determination target positions are changed each time, the changed sticking determination target positions may be determined at random for each frame.

Sixth Modification

When the sticking determination target positions are the same regardless of frames, it is not necessary to compare pixel values for each pixel position. In the sticking determination process for one frame, a hash value may be calculated from several pixel values located in the sticking determination target positions. In this case, the hash value is compared with a previous hash value which is calculated from the previous pixel values from which the current hash value is calculated. When the current hash value is the same as the previous hash value, it is determined that the image data is stuck. According to this, the load on the CPU 48 can be further reduced.

The pixels for calculating the hash value may be some pixels in one horizontal line, for example. The pixels from which the hash value is calculated may be some pixels in one vertical line.

Seventh Modification

In the embodiment, the divided unit is one horizontal line. However, the divided unit may not be one horizontal line. The divided unit may be preferably a unit for saving the image data to the main memory 44 by the IPU 41. When the IPU 41 is configured to save the image data in a smaller unit than one horizontal line to the main memory 44, the divided unit may be smaller than one horizontal line. The divided unit may be multiple lines as long as the divided unit is smaller than the image data of one frame.

Eighth Modification

The CPU 48 and the GPU 46 are control units. The control unit and the method described in the present disclosure may be implemented by a special purpose computer including a processor programmed to perform one or more functions embodied by a computer program. Alternatively, the control unit and the method described in the present disclosure may be implemented by a dedicated hardware logic circuit. Alternatively, the control unit and the method described in the present disclosure may be implemented by one or more dedicated computers configured by a combination of a processor executing a computer program and one or more hardware logic circuits. The hardware logic circuits may be, for example, ASIC or FPGA.

The storage medium for storing the computer program is not limited to ROM. Alternatively, the computer program may be stored in a computer-readable, non-transitory tangible storage medium as instructions to be executed by a computer. For example, the program may be stored in a flash memory.

It is noted that a flowchart or the process of the flowchart in the present disclosure includes multiple steps (also referred to as sections), each of which is represented, for instance, as S1. Further, each step can be divided into several sub-steps while several steps can be combined into a single step.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A sticking determination device configured to determine whether image data having pixel values of a plurality of pixels that form an image taken by a camera is stuck, the sticking determination device comprising:
   a CPU;
   a GPU;
   a memory;
   a bus that connects together the CPU, the GPU, and the memory; and
   an image acquiring unit configured to acquire the image data from the camera and save the image data to the memory, wherein
   the image data of each frame is formed of a plurality of divided units,
   upon saving a respective one of the plurality of divided units to the memory, the image acquiring unit transmits, to the CPU, a save completion notification indicative of completion of saving the respective one of the plurality of divided units,
   upon receiving the save completion notification, the CPU transmits a read instruction to the GPU to read, from the memory, the pixel values of some of the plurality of pixels at positions in one horizontal line serving as sticking determination target positions, upon receiving the read instruction from the CPU, the GPU reads the pixel values of the some of the plurality of pixels from the memory and transmits the read pixel values to the CPU, and the CPU is configured to perform a pixel value comparison process to determine whether the image data is stuck by comparing the pixel values of the some of the plurality of pixels in a current frame that is read from the memory with the pixel values of the some of the plurality of pixels in a previous frame.

2. The sticking determination device according to claim 1, wherein the CPU is configured to use positions of some pixels of the plurality of pixels of the image data of each frame as the sticking determination target positions in a process to determine whether the image data of each frame is stuck.

3. The sticking determination device according to claim 2, wherein the camera is mounted in a vehicle to take the image of an area in front of or behind the vehicle, and the sticking determination device is configured to determine whether the image data is stuck for every frame.

4. The sticking determination device according to claim 2, wherein the CPU is configured to reduce, based on a load on the CPU, a number of the pixels whose positions are used as the sticking determination target positions in the process to determine whether the image data of each frame is stuck.

5. The sticking determination device according to claim 2, wherein the CPU is configured to change at least some of the pixels whose positions are used as the sticking determination target positions for each frame in the process to determine whether the image data of each frame is stuck.

6. The sticking determination device according to claim 5, wherein the CPU is configured to change the sticking determination target positions in the current frame by one pixel from the sticking determination target positions in the previous frame in the process to determine whether the image data of each frame is stuck.

7. The sticking determination device according to claim 5, wherein the CPU is configured to determine the pixels whose positions are used as the sticking determination target positions at random for each frame in the process to determine whether the image data of each frame is stuck.

8. The sticking determination device according to claim 1, wherein the sticking determination target position are set at same positions of a plurality of target pixels regardless of frames, and the CPU is configured to, in a process to determine whether the image data of each frame is stuck,
calculate a hash value from the pixel values of the plurality of target pixels at the sticking determination target positions; and
determine whether the image data is stuck by comparing the hash value calculated from the pixel values in the current frame with the hash value calculated from the pixel values in the previous frame.

9. The sticking determination device according to claim 8, wherein the CPU is configured to calculate the hash value from the pixel values of the pixels in one vertical or horizontal line.

10. A sticking determination device configured to determine whether image data having pixel values of a plurality of pixels that form an image taken by a camera is stuck, the sticking determination device comprising:

a CPU;
a GPU;
a memory;
a bus that connects together the CPU, the GPU, and the memory; and
an image acquiring unit configured to acquire the image data from the camera and save the image data to the memory, wherein upon saving a part or whole of the image data of one frame to the memory, the image acquiring unit transmits, to the CPU, a save completion notification indicative of completion of saving, upon receiving the save completion notification, the CPU transmits a read instruction to the GPU to read, from the memory, the pixel values of some of the plurality of pixels at positions in one horizontal line serving as sticking determination target positions, upon receiving the read instruction from the CPU, the GPU reads the pixel values of the some of the plurality of pixels from the memory and transmits the read pixel values to the CPU, the CPU is configured to perform a pixel value comparison process to determine whether the image data is stuck by comparing the pixel values of the some of the plurality of pixels in a current frame that is read from the memory with the pixel values of the some of the plurality of pixels in a previous frame, and the CPU is configured to use positions of some pixels of the plurality of pixels of the image data of each frame as the sticking determination target positions.

11. The sticking determination device according to claim 10, wherein the CPU is configured to reduce, based on a load on the CPU, a number of the pixels whose positions are used as the sticking determination target positions in a process to determine whether the image data of each frame is stuck.

12. The sticking determination device according to claim 10, wherein the CPU is configured to change at least some of the pixels whose positions are used as the sticking determination target positions for each frame in a process to determine whether the image data of each frame is stuck.

13. The sticking determination device according to claim 12, wherein the CPU is configured to change the sticking determination target positions in the current frame by one pixel from the sticking determination target positions in the previous frame in the process to determine whether the image data of each frame is stuck.

14. The sticking determination device according to claim 12, wherein the CPU is configured to determine the pixels whose positions are used as the sticking determination target positions at random for each frame in the process to determine whether the image data of each frame is stuck.

15. The sticking determination device according to claim 10, wherein
the sticking determination target positions are set at same positions of a plurality of target pixels regardless of frames, and
the CPU is configured to, in a process to determine whether the image data of each frame is stuck,
calculate a hash value from the pixel values of the plurality of target pixels at the sticking determination target positions; and
determine whether the image data is stuck by comparing the hash value calculated from the pixel values in the current frame with the hash value calculated from the pixel values in the previous frame.

16. The sticking determination device according to claim 15, wherein
the CPU is configured to calculate the hash value from the pixel values of the pixels in one vertical or horizontal line.

17. A method for a device to determine whether image data having pixel values of a plurality of pixels that form an image taken by a camera is stuck, the device including:
a CPU;
a GPU;
a memory;
a bus that connects together the CPU, the GPU, and the memory; and
an image acquiring unit configured to acquire the image data and save the image data to the memory, wherein
the image data of each frame is formed of a plurality of divided units, and
the method comprises:
upon saving a respective one of the plurality of divided units to the memory by the image acquiring unit, transmitting, to the CPU by the image acquiring unit, a save completion notification indicative of completion of saving the respective one of the plurality of divided units,
upon receiving the save completion notification by the CPU, transmitting by the CPU a read instruction to the GPU to read, from the memory, the pixel values of some of the plurality of pixels at positions in one horizontal line serving as sticking determination target positions,
upon receiving the read instruction from the CPU by the GPU, reading by the GPU the pixel values of the some of the plurality of pixels from the memory,
transmitting the read pixel values to the CPU by the GPU, and
performing a pixel value comparison process by the CPU to determine whether the image data is stuck by comparing the pixel values of the some of the plurality of pixels in a current frame that is read from the memory with the pixel values of the some of the plurality of pixels in a previous frame.

18. A method for a device to determine whether image data having pixel values of a plurality of pixels that form an image taken by a camera is stuck, the device including:
a CPU;
a GPU;
a memory;
a bus that connects together the CPU, the GPU, and the memory; and
an image acquiring unit configured to acquire the image data and save the image data to the memory,
the method comprising:
upon saving a part or whole of the image data of one frame to the memory by the image acquiring unit, transmitting, to the CPU by the image acquiring unit, a save completion notification indicative of completion of saving,
upon receiving the save completion notification by the CPU, transmitting by the CPU a read instruction to the GPU to read, from the memory, the pixel values of some of the plurality of pixels positions in one horizontal line serving as sticking determination target positions,
upon receiving the read instruction from the CPU by the GPU, reading by the GPU the pixel values of the at least one pixel some of the plurality of pixels from the memory,
transmitting the read pixel values to the CPU by the GPU,
performing a pixel value comparison process by the CPU to determine whether the image data is stuck by comparing the pixel values of the some of the plurality of pixels in a current frame that is read from the memory with the pixel values of the some of the plurality of pixels in a previous frame, wherein
positions of some pixels of the plurality of pixels of the image data of each frame are used as the sticking determination target positions.

* * * * *